United States Patent [19]
Kawamura

[11] 3,844,684
[45] Oct. 29, 1974

[54] PRELIMINARY COMPRESSOR LUBRICATING DEVICE

[75] Inventor: Seiichi Kawamura, Katsuta, Japan

[73] Assignee: Hitachi, Ltd., Tokyo, Japan

[22] Filed: July 31, 1973

[21] Appl. No.: 384,298

[30] Foreign Application Priority Data
Aug. 7, 1972  Japan.................................. 47-78336

[52] U.S. Cl......................... 417/13, 417/15, 417/72, 417/32, 62/133
[51] Int. Cl........................................... F04b 49/00
[58] Field of Search............ 417/14, 13, 15, 18, 22, 417/32, 42; 62/133, 211, 323

[56] References Cited
UNITED STATES PATENTS

| | | | |
|---|---|---|---|
| 3,664,148 | 5/1972 | Yonezo................................. | 62/133 |
| 3,686,891 | 8/1972 | Wills..................................... | 62/323 |
| 3,724,230 | 4/1973 | Muto et al............................. | 62/133 |
| 3,738,118 | 6/1973 | Jacobs.................................. | 62/323 |
| 3,759,058 | 9/1973 | Jacobs.................................. | 62/323 |

*Primary Examiner*—William L. Freeh
*Attorney, Agent, or Firm*—Craig & Antonelli

[57] ABSTRACT

A device for automatically actuating the compressor of an air conditioner for a motor vehicle by the engine of the motor vehicle to effect preliminary lubrication of sliding parts of the compressor upon starting of the engine, in case the engine speed is in a cranking speed range and the open air temperature is above a predetermined level. The device comprises a temperature sensor, an engine speed discriminating circuit and a temperature responsive circuit connected to an AND circuit, and closes a relay and engages an electromagnetic clutch when the engine speed is below 800 rpm and the open air temperature is above 10 °C so as to connect the compressor to the engine to render the former operative.

2 Claims, 3 Drawing Figures

PRELIMINARY COMPRESSOR LUBRICATING DEVICE

BACKGROUND OF THE INVENTION

This invention relates to a preliminary compressor lubricating device for an air conditioner for a motor vehicle.

Generally, a compressor used with an air conditioner for a motor vehicle is connected or disconnected to the engine of the motor vehicle through an electromagnetic clutch and operated by the engine when connected thereto. Lubricant is supplied to sliding parts of the compressor as by an oil pump. When the compressor is out of service over a prolonged interval, the lubricant in these parts will be moved therefrom by gravitational pull or evaporate and the sliding parts will become dry because they are devoid of lubricant.

If the compressor is operated at this time, excess wear and tear will be caused on the compressor and galling or seizure will occur at the interfaces of the sliding parts in case the engine speed is at a relatively high level. This is because a certain period of time elapses before the sliding parts receive a supply of lubricant by the oil pump which is actuated at the same time as the compressor is rendered operative, so that the sliding parts are operated while lacking lubrication during this time interval.

SUMMARY OF THE INVENTION

This invention has as its object the provision of a preliminary compressor lubricating device which automatically supplies lubricant to sliding parts of the compressor under certain conditions so as to preclude galling or seizure at the interfaces of the sliding parts due to lack of lubrication.

According to the invention, there is provided a device for automatically effecting preliminary lubrication of a compressor of an air conditioner for a motor vehicle adapted to be connected and disconnected to an engine of the motor vehicle through an electromagnetic clutch and provided with means for supplying lubricant to sliding parts of the compressor, comprising an engine speed discriminating circuit connected to an ignition circuit for the engine, a sensor for sensing the open air temperature, an open air temperature responsive circuit adapted to respond to the prevailing open air temperature, and an AND circuit connected to output terminals of the engine speed discriminating circuit and the temperature responsive circuit and producing a signal to a compressor starting relay to close the relay and engage the electromagnetic clutch when the engine speed is a cranking speed or idling speed and the open air temperature is above a predetermined level.

The invention permits preliminary lubrication of the sliding parts of the air conditioner compressor to be effected automatically by the oil pump by automatically rotating the compressor upon starting of the engine when the engine speed is a cranking speed and the open air temperature is above a predetermined level, so that occurrence of seizure or galling at the interfaces can be precluded. When the open air temperature is below the predetermined level, the device according to the invention remains inoperative and does not actuate the air conditioner compressor so as not to interfere with the starting of the engine.

Other and additional objects and features of the invention will become evident from the description set forth hereinafter when considered in conjunction with the accompanying drawings.

DESCRIPTION OF A PREFERRED EMBODIMENT

Figure 3:
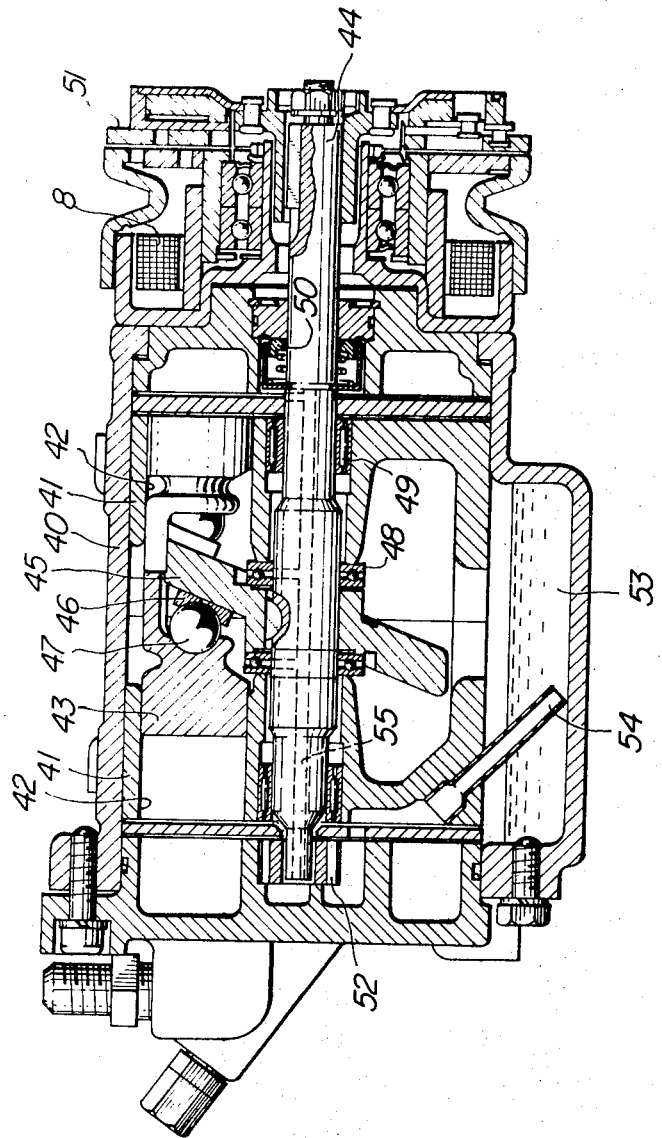
FIG. 3 is a vertical sectional view of a conventional compressor of the tilting disc type.

Before giving a detailed explanation of the invention, I would like to describe briefly a compressor of the tilting disc type shown in FIG. 3 which is typical compressor of a motor vehicle air conditioner. In the figure, 41 designates a pair of cylinder blocks enclosed in a shell 40 and each having mounted therein a plurality of cylinders 42 with a piston 43 being fitted in each cylinder 42. A drive shaft 44 has secured thereto a tilting disc 45 for converting rotary movements of the drive shaft 44 into reciprocating movements through slippers and balls 47. 48 designates thrust bearings, and 49 needle bearings. 50 is a shaft seal.

An electromagnetic clutch 51 is secured to one end of the drive shaft 44 for intermittently connecting and disconnecting the shaft 44 to a drive shaft on the engine side, and an oil pump 52 is secured to the other end of the shaft 44 for drawing lubricant by suction through a pipe 54 from a oil sump 53 provided in a lowermost portion of the shell 40. The lubricant drawn from the oil sump 53 is supplied through an oil duct 55 formed axially in the drive shaft 44 to the thrust bearings 48, needle bearings 49 and shaft seal 50. The lubricant supplied to the needle bearings 49 is directed by centrifugal forces to interfaces between the tilting disc 45 and slippers 46. Lack of lubrication, even for a short time interval, tends to result in the occurrence of seizure at the interfaces between the tilting disc 44 and slippers 46.

Generally, the compressor has to make a considerable number of revolutions (generally ten odd revolutions) before the lubricant pumped up by the gear pump reaches the interfaces between the tilting disc 45 and slippers 46. A small amount of lubricant remaining on the surfaces of tilting disc 45 and elsewhere is effective to preclude occurrence of seizure when the compressor is re-started after lapse of a relatively short interval following use. However, if the compressor is placed out of service for a long interval of time or, say, about a week, the interfaces of the sliding parts will lack lubrication because of evaporation or downward movement by gravitational pull, so that seizure will occur at interfaces between the tilting disc 45 and slippers 46 soon after the compressor is started. This is especially the case when the compressor is started after the air conditioner has been left unused for several months.

This invention provides a preliminary compressor lubricating device which obviates the aforementioned disadvantage of the air conditioner compressor of the tilting disc type of the prior art. The device is effective to start the compressor upon starting of the engine to supply lubricant to the interfaces of the sliding parts of the compressor in case the engine speed is in a idling speed range and the open air temperature is above a predetermined level.

Figure 1:
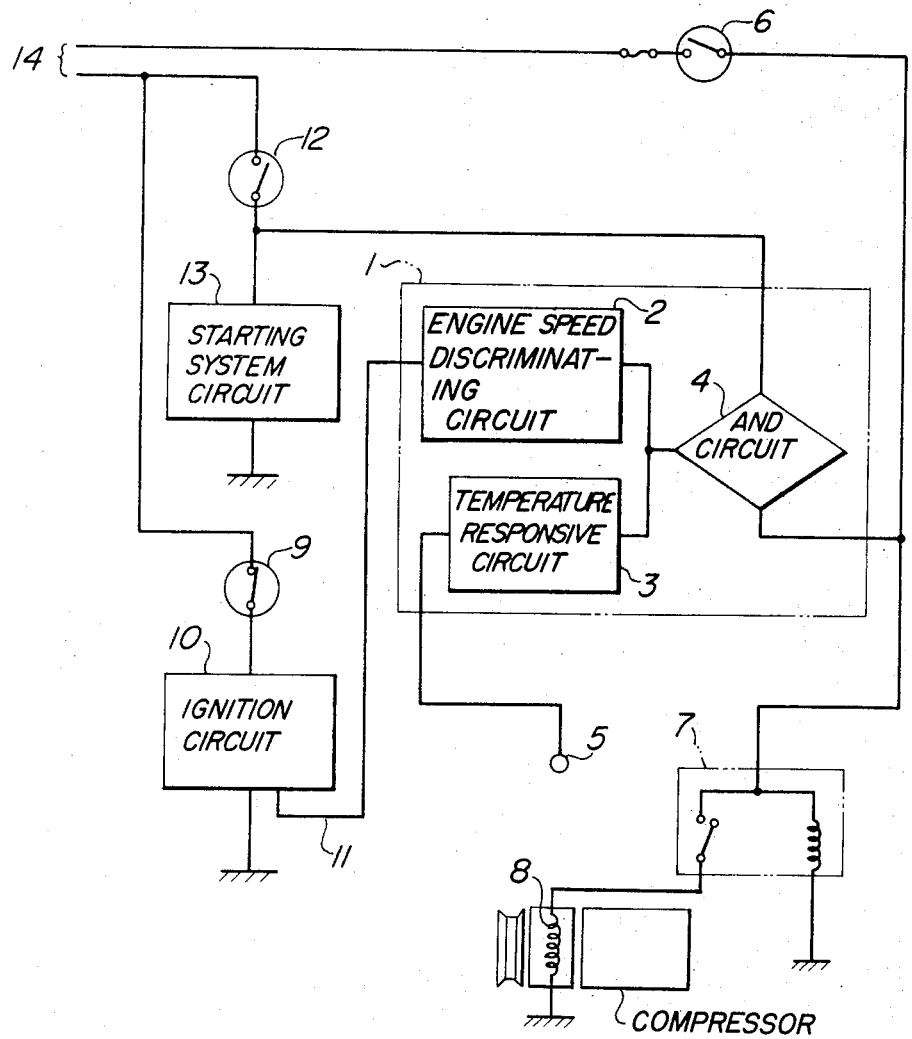
FIG. 1 is a systematic view of the preliminary compressor lubricating device according to the invention, in explanation of the principle on which the invention is based.
Figure 2:
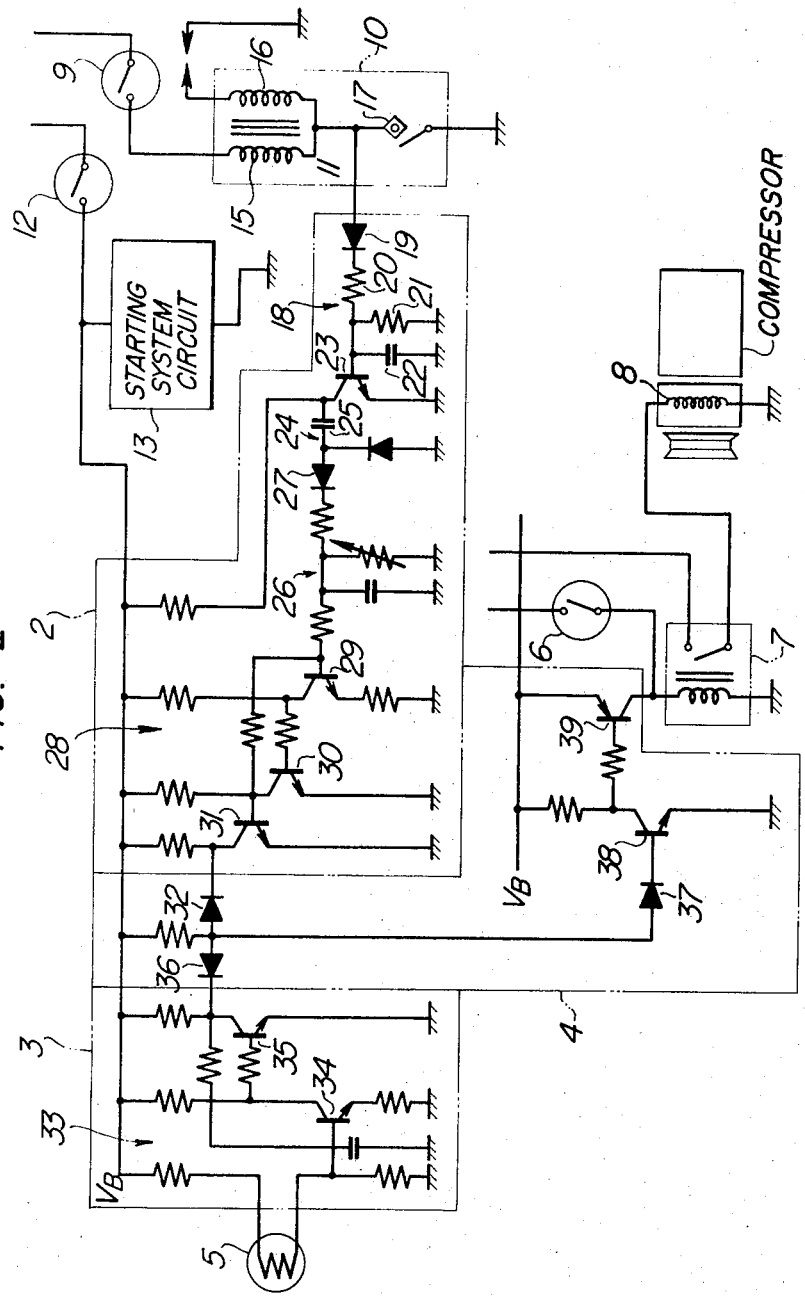
FIG. 2 is a circuit diagram of the device according to the invention.

One embodiment of the invention will now be described with reference to FIG. 1 and FIG. 2. The numeral 1 generally designates a main body of the preliminary compressor lubricating device and comprises an engine speed discriminating circuit 2, an open air temperature sensing circuit 3 and an AND circuit. 5 is a sensor whose output is supplied to the temperature responsive circuit 3, 6 is a compressor switch, 7 a compressor starting relay, and 8 an electromagnetic coil for operating the compressor.

9 is an ignition switch. 10 is an ignition circuit, and 11 an ignition first pulse take-out line. 12 is a starter switch, 13 a starting system circuit, and 14 a power source. The ignition circuit 10 includes a primary coil 15, a secondary coil 16 and an interrupter 17. The ignition first pulse take-out line 11 is connected to a diode 19 of a filter circuit 18 of the engine speed discriminating circuit 2.

The filter circuit 18 further comprises resistors 20, 21 and a capacitor 22 and its output is supplied to the base of a transistor 23 whose collector is connected to a capacitor 25 of a differentiator circuit 24 which in turn is connected to a diode 27 at one end of an integrator circuit 26. The integrator circuit 26 is connected at the other end to the base of a transistor 29 of a Schmitt circuit 28 which further comprises transistors 30, 31, the collector of transistor 31 being connected to a diode 32 of the AND circuit 4.

The output of sensor 5 is supplied to the base of a transistor 34 of a Schmitt circuit 33 making up the temperature responsive circuit 3. The collector of a transistor 35 is connected to a diode 36 of the AND circuit 4.

Signals supplied to the diodes 32 and 36 of the AND circuit 4 are supplied, through a diode 37, to the base of a transistor 38 whose collector is connected to the base of another transistor 39 whose collector is connected to a compressor starting relay 7.

Operation of the preliminary compressor lubricating device constructed as aforementioned will be described. The device is rendered operative to automatically start the compressor upon starting of the engine in case the open air temperature is above a predetermined level and the engine speed is slightly higher than a cranking speed. For example, the device is actuated when the open air temperature is above 10°C and the engine speed is below 800 rpm.

More specifically, the starter switch 12 is turned on when the engine is started, the open air temperature is sensed by the sensor 5. When the open air temperatures is above 10°C, the transistor 34 of the temperature responsive circuit 3 is turned on and transistor 35 is turned off.

On the other hand, intermittent pulses produced by the ignition coils which are proportional to the engine speed are supplied, through the primary pulse take-out line 11 and the filter circuit 18, to transistor 23 which is intermittently turned on the pulses are supplied thereto and turned off when no pulses are supplied thereto. Consequently, the periods of charging and discharging of the capacitor 25 vary depending on changes in engine speed. Thus, the voltage impressed on the base of transistor 29 through the integrator circuit 26 is increased as the engine speed becomes higher. Transistor 29 is off when the engine speed is below 800 rpm, so that transistor 30 is turned on and transistor 31 is turned off.

If transistors 35 and 31 are turned off as aforementioned, then the transistor 38 of the AND circuit 4 is turned on and transistor 39 is also turned on. This closes the compressor starting relay 7 and excites the compressor operating electromagnetic coil 8, with the result that the electromagnetic clutch is engaged to connect the compressor to the engine. Thus, the compressor is rotated by the engine shaft and lubricant is supplied to the sliding parts of the compressor by the oil pump 52 which rotates with the compressor.

If the starter switch 12 is turned off, the compressor starting relay 7 is opened and the electromagnetic clutch is disengaged, so that the compressor is disconnected from the engine and rendered inoperative.

From the foregoing description, it will be appreciated that the device according to the invention is effective to render operative the compressor of the air conditioner for a motor vehicle upon starting of its engine when the engine speed is in a low speed range or in a cranking or idling speed range and the open air temperature is above a predermined level. Since the compressor is actuated when the engine speed is in a low speed range, no high forces are exerted on the sliding parts of the air conditioner compressor which move at a relatively low speed, so that there are little or no possibilities of occurrence of seizure at the interfaces of these parts even if the compressor is rotated while it temporarily lacks lubrication. Moreover, the interfaces of these parts have some lubricant left over from the previous operation although its quantity may be very low. This greatly reduces the possibilities of occurrence of seizure at the interfaces. While the compressor is rotated at low speed by the device according to the invention, the sliding parts of the compressor can be lubricated preliminarily. Thus, seizure, which might otherwise occur due to lack of lubrication if the air conditioner compressor of the motor vehicle were actuated at prevailing engine speed without effecting preliminary lubrication after the air conditioner has been out of service for a considerably long interval. If the device according to the invention is employed, it is possible to effect preliminary lubrication of the sliding parts of the air conditioner compressor while the engine is still rotating at low speed. Thus, no seizure occurs at the interfaces of the sliding parts when the compressor switch is actuated to start the compressor when the engine speed is in a high speed range.

When the open air temperature sensed by the sensor is below 10°C, transistor 35 is turned off and consequently the compressor starting relay 7 is not closed even if the motor vehicle engine is started. That is because the air conditioner compressor had better not be actuated because the capacity of the battery is lowered and difficulty is experienced in starting the engine when the open air temperature is low. It is also because the air conditioner will not probably be placed in service when the open air temperature is low. The open air temperature at whcih the device according to the invention is actuated upon starting of the motor vehicle engine at low speed may vary depending on the capacity of the battery used and the specification of the air conditioner used. Generally, such temperature may be suitably selected from a range from 5° to 15°C.

What I claim is:

1. A device for effecting preliminary lubrication of a compressor of an air conditioner for a motor vehicle adapted to be connected and disconnected to an engine of the motor vehicle through an electromagnetic clutch and provided with means for supplying lubricant to sliding parts of the compressor, comprising an engine speed discriminating circuit connected to an ignition circuit for the engine, a sensor for sensing the open air temperature, an open air temperature responsive circuit adapted to respond to the prevailing open air temperature, and an AND circuit connected to output terminals of the engine speed discriminating circuit and the temperature responsive circuit and producing a signal to a compressor starting relay to close the relay and engage the electromagnetic clutch when the engine speed is a cranking speed or idling speed and the open air temperature is above a predetermined level.

2. A device according to claim 1 wherein said engine speed discriminating circuit comprises a filter circuit connected to an ignition circuit of the motor vehicle and including a diode connected to the ignition circuit through a primary ignition pulse take-out line of the motor vehicle, a plurality of resistors and a capacitor, a transistor having a base connected to an output terminal of said filter circuit, a differentiating circuit including a capacitor connected to a collector of said transistor, an integrating circuit including a diode connected to said differentiating circuit, and a Schmitt circuit including a first transistor, a second transistor and a third transistor, said first transistor having a base connected to said integrating circuit and said third transistor having a collector connected to said AND circuit; said open air temperature responsive circuit comprises a Schmitt circuit including a first transistor and a second transistor, said first transistor having a base connected to said temperature sensor and said second transistor having a collector connected to said AND circuit; and said AND circuit comprises a first diode connected to said collector of said third transistor of said Schmitt circuit of said engine, a second diode connected to said collector of said second transistor of said Schmitt circuit of said open air temperature responsive circuit, a first transistor connected to said first and second diodes through a third diode and having a collector connected to a base of a second transistor having a collector connected to a compressor starting relay connected to the electromagnetic clutch.

* * * * *